United States Patent
Littlewood

(10) Patent No.: US 8,916,986 B2
(45) Date of Patent: Dec. 23, 2014

(54) IMPULSE AIR TURBINE ARRANGEMENT FOR USE WITH A REVERSING BI-DIRECTIONAL AIR FLOW IN A WAVE POWER PLANT

(71) Applicant: Alstom Renewable Technologies, Grenoble (FR)

(72) Inventor: Lucy Littlewood, Rugby (GB)

(73) Assignee: Alstom Renewable Technologies, Grenoble (FR)

(*) Notice: Subject to any disclaimer, the term of this patent is extended or adjusted under 35 U.S.C. 154(b) by 72 days.

(21) Appl. No.: 13/623,800

(22) Filed: Sep. 20, 2012

(65) Prior Publication Data

US 2013/0069371 A1  Mar. 21, 2013

(30) Foreign Application Priority Data

Sep. 21, 2011 (GB) .................... 1116269.0

(51) Int. Cl.
| F03B 13/10 | (2006.01) |
| F03B 13/12 | (2006.01) |
| H02P 9/04 | (2006.01) |
| F03B 13/14 | (2006.01) |
| F03D 1/00 | (2006.01) |

(52) U.S. Cl.
CPC ......... *F03B 13/142* (2013.01); *F05B 2240/132* (2013.01); *Y02E 10/72* (2013.01); *Y02E 10/38* (2013.01); *F03D 1/00* (2013.01); *Y02E 10/32* (2013.01); *F05B 2210/404* (2013.01)
USPC ....................................... 290/53

(58) Field of Classification Search
CPC ......... Y02E 10/38; Y02E 10/28; Y02E 10/32; Y02E 10/72; Y02E 10/725; Y02E 10/74; Y02E 10/728; F03B 13/20; F03B 13/1815; F03B 13/187; F03B 13/142; F03B 1/00; F03D 1/00; F03D 9/002; F05B 2210/404; F05B 2240/132
USPC ........... 290/53, 55, 54, 43, 42, 44; 415/152.2, 415/4.3
See application file for complete search history.

(56) References Cited

U.S. PATENT DOCUMENTS

| 1,310,681 A | 7/1919 | Sherbondy |
| 5,577,385 A * | 11/1996 | Kapich ........................... 60/612 |

FOREIGN PATENT DOCUMENTS

| GB | 1 083 227 A | 9/1967 |
| JP | 56-150867 | 11/1981 |
| JP | 2004-100579 A | 4/2004 |

OTHER PUBLICATIONS

Sep. 8, 2014 Japanese Office Action issued in Japanese Patent Application No. 2012-206693 (with English language translation).

* cited by examiner

*Primary Examiner* — Javaid Nasri
(74) *Attorney, Agent, or Firm* — Buchanan Ingersoll & Rooney PC

(57) ABSTRACT

An impulse air turbine arrangement for use with a reversing bi-directional air flow in a wave power plant comprises an axial flow turbine rotor with volutes mounted one each side of the turbine rotor to direct the reversing air flow to and from the turbine rotor. Each volute extends circumferentially with respect to the turbine axis between a radially outer opening and a radially inner opening. The radially outer opening is oriented for input/output of the air in a tangential direction and the radially inner opening is oriented axially to impinge/receive swirling air flow onto/from the turbine rotor.

12 Claims, 4 Drawing Sheets

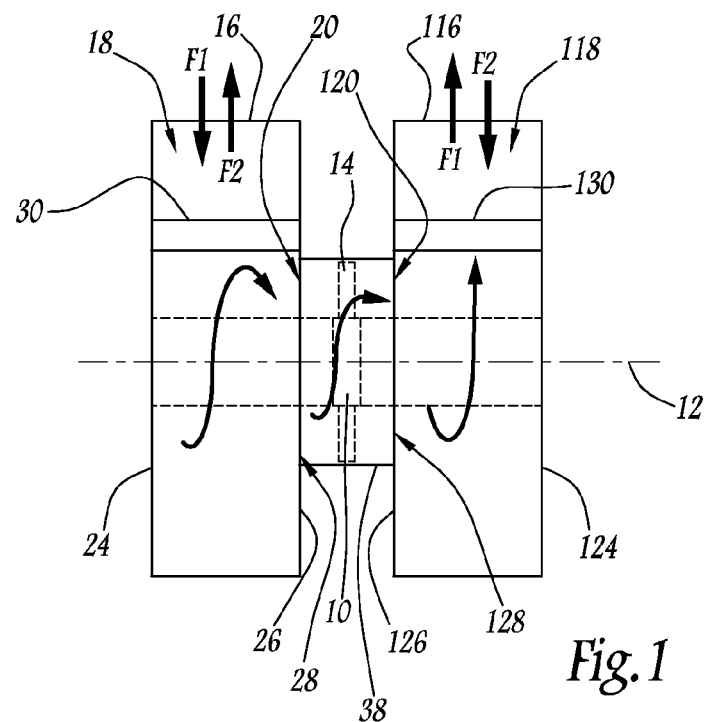
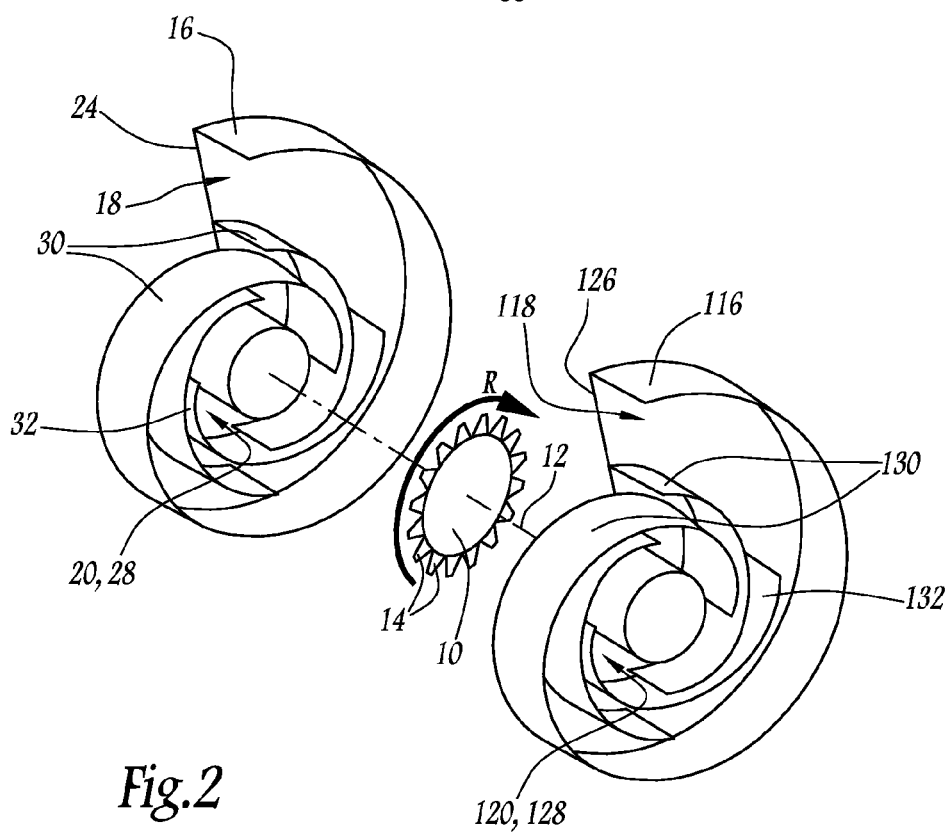

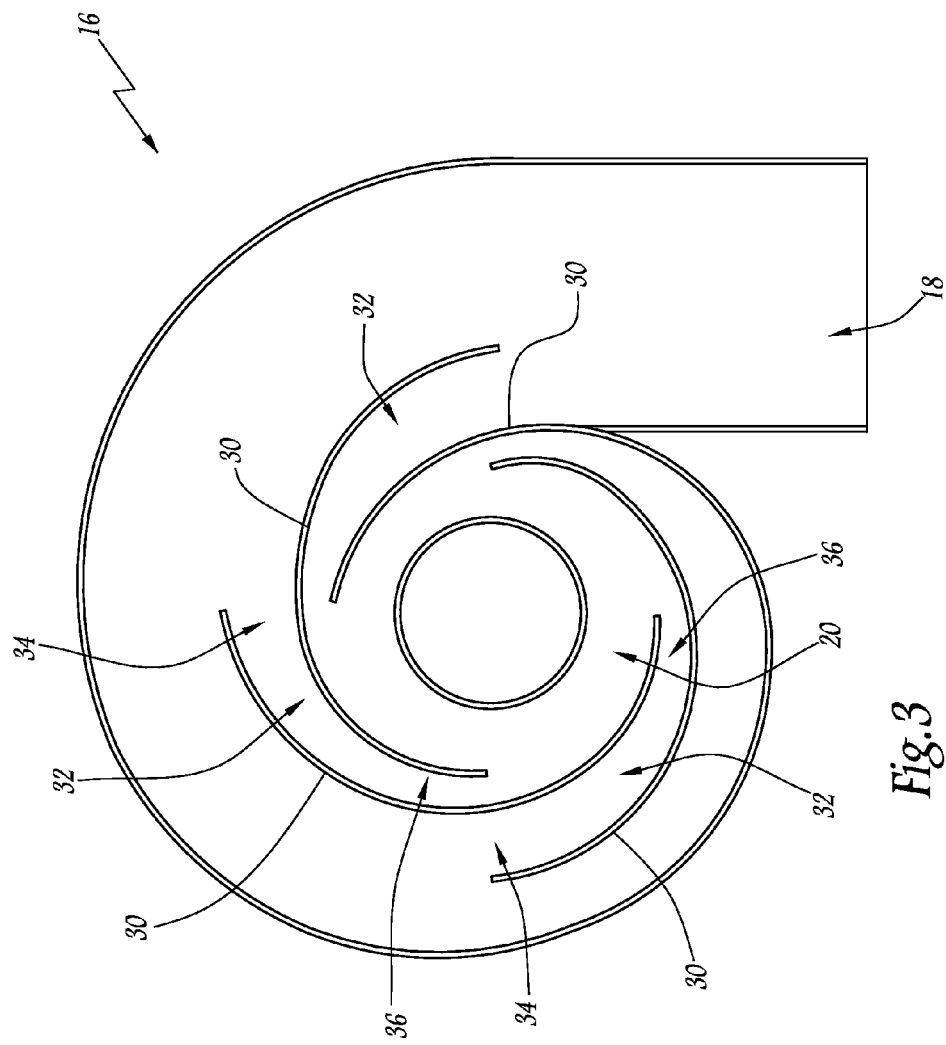

IMPULSE AIR TURBINE ARRANGEMENT FOR USE WITH A REVERSING BI-DIRECTIONAL AIR FLOW IN A WAVE POWER PLANT

CROSS-REFERENCE TO RELATED APPLICATIONS

This application claims the benefit of British Application No. 1116269.0 filed Sep. 21, 2011, which is hereby expressly incorporated by reference in its entirety.

TECHNICAL FIELD

The present disclosure relates generally to an impulse air turbine arrangement for use with a reversing bi-directional air flow in a wave power plant. Embodiments of the present disclosure relate to an impulse air turbine arrangement for use with a reversing bi-directional air flow generated by a wave energy converter. The impulse air turbine arrangement is, thus, intended to be used for electrical power generation.

TECHNICAL BACKGROUND

Wave power plants utilise a wave energy converter to convert the rising and falling motion of sea waves into a reversing bi-directional air flow. Oscillating-water-column (OWC) wave power plants, in which the rising and falling motion of the wave surface in an air compression chamber produces a reversing bi-directional air flow, are widely used. Wave power plants, whether of the OWC type or otherwise, include a power take-off device which utilises the reversing bi-directional air flow to generate electrical power. The power take-off device is typically an air turbine which must rotate continuously in the same direction regardless of the air flow direction through the turbine.

The Wells turbine is commonly used in wave power plants and in particular OWC wave power plants. The turbine rotor blades of the Wells turbine comprise symmetrical aerofoils to maintain rotation of the rotor in the same direction irrespective of the air flow direction. The Wells turbine is not, however, suited to operation over a large range of flow rates, with high flow rates in particular having a tendency to cause stall. The operating efficiency of the Wells turbine is typically between 50 and 55%.

Another air turbine, known as the Dennis-Auld turbine, utilises variable pitch rotor blades to improve operating efficiency and is specifically designed for use with OWC wave power plants. A mechanical actuation system is used to vary the setting angle of the rotor blades but this increases the maintenance burden and may lead to reduced reliability. A control system is also needed to control the operation of the mechanical actuation system based on real-time measurements of wave profile parameters such as wave height, wave shape and wave duration. However, given the irregular wave profiles that are typically encountered by OWC wave power plants, it can be difficult to correctly identify when a variation in blade setting angle is actually needed.

In another known turbine arrangement comprising an impulse air turbine, the air flow is initially directed through a set of circumferentially spaced guide vanes which in turn direct the air flow onto the turbine rotor blades at a suitable angle and velocity. In order to handle the reversing bi-directional air flow that is encountered in a wave power plant, a set of circumferentially spaced guide vanes is disposed on each side of the turbine rotor.

The setting angle of the circumferentially spaced guide vanes is typically fixed which means that the geometry of the guide vanes cannot be optimised for air flow in both directions through the turbine. The setting angle of the guide vanes on each side of the turbine rotor is typically selected to direct the air flow onto the rotor blades at an optimum angle and velocity. As a consequence, the setting angle of the guide vanes is not optimised to accept the swirling air flow from the downstream side of the turbine rotor and this leads to a large pressure drop across the downstream guide vanes and a consequent reduction in the operational efficiency of the turbine.

A variable radius impulse air turbine for an OWC wave power plant which attempts to address this difficulty is described in WO-A-2008/012530. The turbine has two identical sets of fixed-geometry circumferentially spaced guide vanes located on opposite sides of the turbine rotor and annular flow passages extending from each set of guide vanes to the turbine rotor. In contrast to the topology described above, the guide vanes on each side of the turbine rotor are radially offset from the rotor blades at a greater radius than the rotor blades. The guide vanes upstream of the turbine rotor impart a swirl motion to the air flow which then accelerates as it flows through the upstream annular flow passage towards the smaller diameter turbine rotor. The air flow subsequently has an opportunity to decelerate as it travels through the downstream annular flow passage before passing through the downstream guide vanes. Although the operational efficiency of this impulse air turbine is greater than that of an impulse air turbine having the topology described above, it is significantly more bulky and requires large diameter ducting and pipe work to direct the air flow to and from the guide vanes.

It would, therefore, be desirable to provide an improved impulse air turbine arrangement for use with a reversing bi-directional air flow which overcomes some or all of the difficulties associated with currently available air turbines including those described above.

SUMMARY OF THE DISCLOSURE

According to a first aspect, there is provided an impulse air turbine arrangement for use with a reversing bi-directional air flow in a wave power plant, the impulse air turbine arrangement comprising:
an axial flow turbine rotor mounted for rotation about a turbine axis;
volutes mounted one each side of the turbine rotor to direct the reversing air flow to and from the turbine rotor, each volute extending circumferentially with respect to the turbine axis between a radially outer opening and a radially inner opening;
the radially outer opening being oriented for input/output of the air in a tangential direction and the radially inner opening being oriented axially to impinge/receive swirling air flow onto/from the turbine rotor.

According to a second aspect, there is provided a wave power plant comprising a wave energy converter for providing a reversing bi-directional air flow and an impulse air turbine arrangement according to the first aspect arranged to be driven by the reversing bi-directional air flow and coupled to an electrical generator to drive the electrical generator.

The air flowing through the air turbine arrangement initially flows through the volute axially upstream of the turbine rotor, thereafter flows through the turbine rotor and finally flows through the volute axially downstream of the turbine rotor.

As the air flows through the axially upstream volute, it initially enters the radially outer opening in the tangential direction. The air then flows through the volute, in a circumferential and radially inward direction, towards the radially inner opening. As the air flows through the volute, it is accelerated and imparted with a tangential swirl component before the swirling air flow is directed through the axially oriented radially inner opening and impinged onto the turbine rotor.

The air exiting the downstream side of the turbine rotor is received through the axially oriented radially inner opening of the axially downstream volute. The air then flows through the volute, in a circumferential and radially outward direction, towards the radially outer opening. As the air flows through the volute, it is diffused and de-swirled before exiting the volute in the substantially tangential direction through the radially outer opening.

The volutes mounted on each side of the axial flow turbine rotor optimise the air flow through the air turbine arrangement irrespective of the air flow direction, thus enabling the impulse air turbine arrangement to achieve a good operational efficiency when operating with a reversing bi-directional air flow. The relatively axially compact geometry of the volutes provides a correspondingly axially compact impulse air turbine arrangement.

The cross-sectional flow area of each volute may decrease from the radially outer opening towards the radially inner opening. The decreasing flow area accelerates the air as it flows through the volute from the radially outer opening towards the radially inner opening. Similarly, when the air flow is in the opposite direction, the increasing flow area decelerates the air flow.

Each volute may comprise a pair of axially spaced walls and a plurality of circumferentially extending flow control vanes located between the axially spaced walls. The radially inner opening of each volute may be provided at a substantially central region of the wall of each volute adjacent to the turbine rotor.

The impulse air turbine arrangement may include means for varying the flow area through each volute. In some embodiments, one or both of the walls of each volute may be movable axially to vary the flow area. Typically, the position of the inner wall adjacent to the turbine rotor is fixed axially and the position of the outer wall is movable axially. It may be advantageous to be able to vary the flow area so that the flow conditions through the volutes, and the resultant pressure drop across the turbine rotor, can be optimised, for example according to the prevailing sea state. This may also facilitate turbine damping and/or turbine speed control.

One or more of the radially adjacent circumferentially extending flow control vanes may cooperate to define one or more circumferentially extending flow corridors within each volute. The one or more circumferentially extending flow corridors direct the air flow between the radially outer and radially inner openings of each volute. Each flow corridor may have a radially outer circumferential opening and a radially inner circumferential opening.

One or more of the circumferentially extending flow control vanes may be movable to vary its sweep angle and hence the radial spacing between radially adjacent circumferentially extending flow control vanes and thus the cross-sectional flow area of the one or more flow corridors at the radially outer and radially inner circumferential openings.

As an alternative to circumferentially extending flow control vanes and axially spaced walls, each volute may comprise a single continuous fluid flow passage in the form of a circumferentially extending duct.

The radially inner opening of each volute may be substantially annular in cross-section. In some arrangements, the radially inner circumferential opening of each flow corridor may be positioned radially outwardly of the axially oriented, and possibly substantially annular, radially inner opening of each volute.

A turbine casing may surround the turbine rotor and may extend axially between the volutes. A machine casing may surround both the turbine rotor and its associated casing and the volutes on each side of the turbine rotor.

BRIEF DESCRIPTION OF THE DRAWINGS

FIG. 1 is a diagrammatic cross-sectional view of an impulse air turbine arrangement according to the present disclosure including volutes on each side of a turbine rotor;

FIG. 2 is an exploded diagrammatic perspective view of the impulse air turbine arrangement of FIG. 1;

FIG. 3 is a diagrammatic cross-sectional view of one of the volutes illustrated in FIG. 1;

DETAILED DESCRIPTION OF PREFERRED EMBODIMENTS

Figure 4:
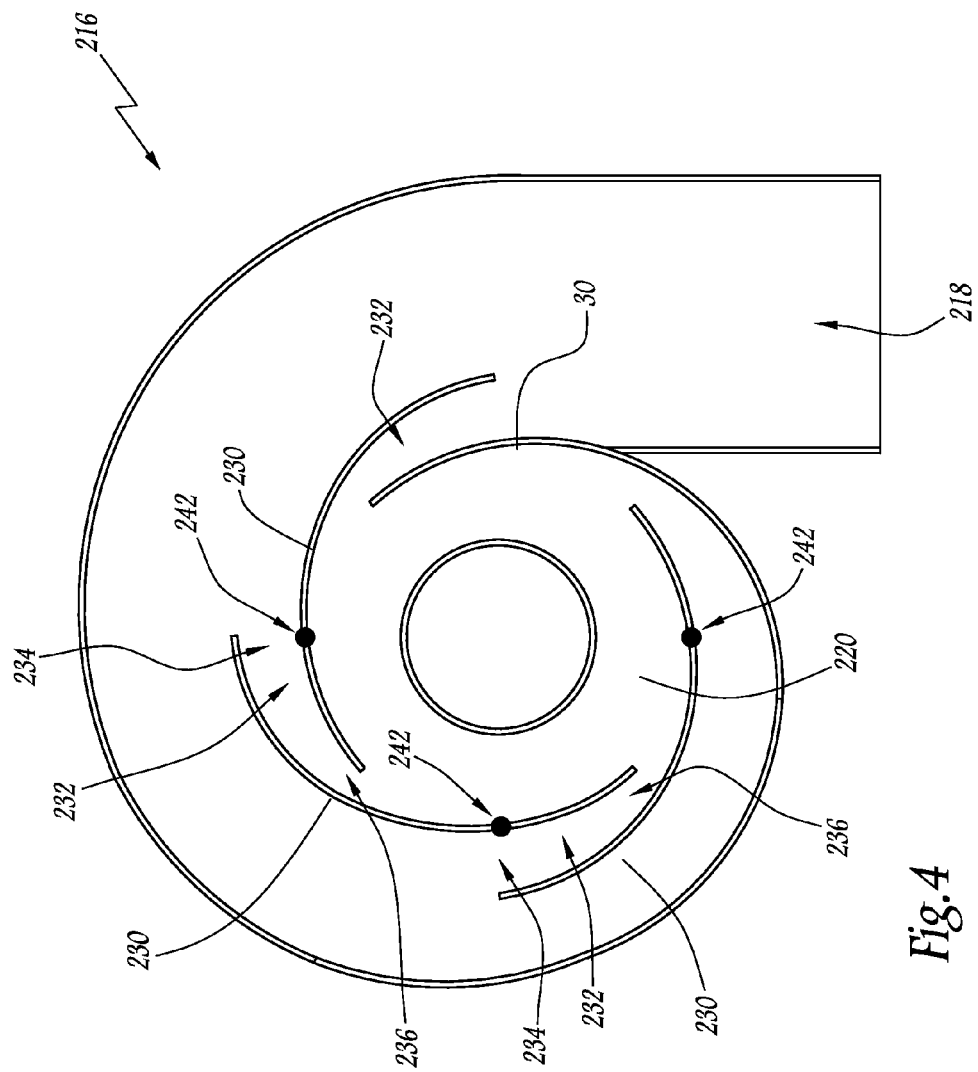
FIG. 4 is a diagrammatic cross-sectional view of an alternative volute geometry.
Figure 5:
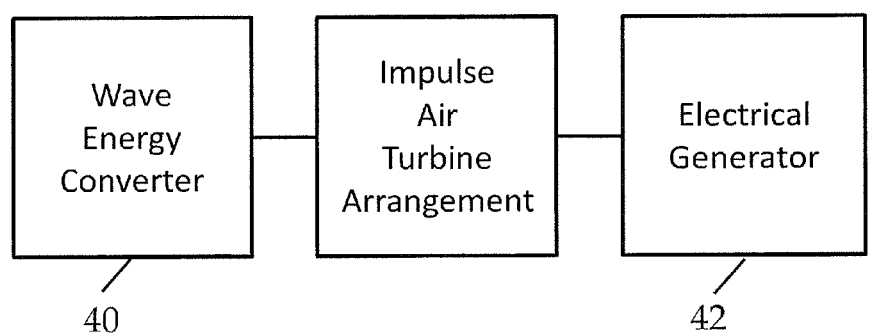
FIG. 5 is a diagrammatic view of the components of an exemplary wave power plant.

Preferred embodiments will now be described by way of example only and with reference to the accompanying drawings.

Referring initially to FIGS. 1 and 2, an impulse air turbine arrangement comprises an axial flow turbine rotor 10 having a turbine axis 12 about which the turbine rotor 10 rotates and a plurality of rotor blades 14 spaced circumferentially about the turbine rotor 10. The impulse air turbine arrangement forms part of a wave power plant in which a wave energy converter 40 is used to convert the rising and falling motion of sea waves into a bi-directional reversing air flow. The impulse air turbine arrangement is particularly suited for use with a wave energy converter 40 having ducting which directs the reversing bi-directional air flow to and from the turbine arrangement. The turbine rotor 10 is coupled to an electrical generator 42 and drives the electrical generator 42 to generate electrical power. It will be understood that the turbine rotor 10 must rotate continuously in the same direction of rotation R about the turbine axis 12 irrespective of the air flow direction through the turbine arrangement. This is achieved in an efficient manner using the impulse turbine arrangement according to embodiments of the present disclosure.

In order to optimise the air flow to and from the turbine rotor 10 through the impulse turbine arrangement and thereby maximise the operational efficiency of the turbine arrangement, a volute 16, 116 is mounted on each side of the turbine rotor 10 to direct the reversing air flow to and from the turbine rotor 10. Each volute 16, 116 extends circumferentially with respect to the turbine axis 12 between a radially outer opening 18, 118 and a radially inner opening 20, 120. The radially outer opening 18, 118 of each volute 16, 116 is oriented for the input/output of air in a tangential direction whilst the radially inner opening 20, 120 of each volute 16, 116 is oriented axially to impinge/receive swirling air flow onto/from the turbine rotor 10. Normally, the radially outer opening 18, 118 of each volute 16, 116 is connected to a duct of a wave energy converter 40 to enable air to be directed to and from the turbine rotor 10 through the volutes 16, 116.

Each volute 16, 116 comprises an axially outer wall 24, 124 and an axially inner wall 26, 126 adjacent to the turbine rotor 10. Only part of the axially outer wall 24 of the volute 16 and part of the axially inner wall 126 of the volute 116 are shown in FIG. 2, whilst the axially inner wall 26 of the volute 16 and the axially outer wall 124 of the volute 116 are omitted from FIG. 2 in their entirety. Each axially inner wall 26, 126 includes an annular opening 28, 128 centred on the turbine axis 12 which acts as the radially inner opening 20, 120. A turbine casing 38 surrounds the turbine rotor 10 and extends between the axially inner walls 26, 126. Although not illustrated, a machine casing surrounds the turbine rotor 10 and its associated turbine casing 38 and the volutes 16, 116 when the air turbine arrangement is installed in a wave power plant.

A plurality of radially and circumferentially extending flow control vanes 30, 130 are positioned between the axially outer wall 24, 124 and the axially inner wall 26, 126 of each volute 16, 116. As best seen in FIGS. 2 and 3, sets of radially adjacent flow control vanes 30, 130 cooperate to form radially and circumferentially extending flow corridors 32, 132 each of which has a radially outer circumferential opening 34 and a radially inner circumferential opening 36. Each of the flow control vanes 30, 130 has a continuously reducing radius of curvature in the radially inward circumferential direction from the radially outer circumferential opening 34 towards the radially inner circumferential opening 36. The radially adjacent flow control vanes 30, 130 converge in the radially inward circumferential direction such that each flow corridor 32, 132 becomes progressively narrower in a direction from the radially outer circumferential opening 34 towards the radially inner circumferential opening 36. Accordingly, the cross-sectional flow area of each flow corridor 32, 132 decreases progressively in the radially inward circumferential direction.

During the rising motion of a sea wave, air flows through the impulse air turbine arrangement in a first flow direction F1 as illustrated in FIG. 1 and more particularly through the volute 16 which directs it to the turbine rotor 10 and then through the volute 116 which directs it from the turbine rotor 10. Similarly, during the falling motion of a sea wave, air flows through the impulse turbine in the opposite second flow direction F2 and more particularly through the volute 116 which directs it to the turbine rotor 10 and then through the volute 16 which directs it from the turbine rotor 10.

In more detail, when the air flow is in the first direction F1, it flows initially in the tangential direction into the volute 16 through the tangentially oriented radially outer opening 18. The air is then directed by the flow control vanes 30 in a radially inward circumferential direction through the volute 16 from the radially outer opening 18 towards the radially inner opening 20 adjacent to the turbine rotor 10. As the air flows through the progressively narrowing flow corridors 32 and in the radially inward circumferential direction, it is accelerated and imparted with a tangential swirl component. The swirling air flow is then directed through the axially oriented radially inner opening 20 so that the swirling air flow is impinged onto the rotor blades 14 of the turbine rotor 10 to rotate the turbine rotor 10.

The swirling air flow then enters the volute 116 through the axially oriented radially inner opening 120 and is directed by the flow control vanes 130 in a radially outward circumferential direction through the volute 116 from the radially inner opening 120 towards the radially outer opening 118. As the air flows through the progressively widening flow corridors 132, it is diffused and de-swirled. The air finally exits the volute 116 in a substantially tangential direction through the radially outer opening 118.

When the air flows in the opposite direction F2, it initially flows through the volute 116, thereafter through the turbine rotor 10 and finally through the volute 16. In this case, it will be understood that the volute 116 accelerates the air flow and imparts it with a tangential swirl component, before the swirling air flow is impinged onto the rotor blades 14 of the turbine rotor 10. The volute 16 then diffuses and de-swirls the air flow from the turbine rotor 10. The impulse air turbine arrangement achieves a good operational efficiency irrespective of the air flow direction and is particularly suited to the high volumetric flows with low available pressure drop that are encountered in wave power plants where the flow direction reverses every six to twelve seconds during typical operating conditions. The air turbine arrangement is able to perform efficiently over a wide range of air flow rates.

Referring now to FIG. 4, there is shown a volute 216 having an alternative geometry. The parts of volute 216 similar to the ones of volute 116 have the same references increased by 200. Unless otherwise specified, volute 216 works as volute 16. The volute 216 is similar to the volutes 16, 116 and comprises a plurality of radially and circumferentially extending flow control vanes 230 positioned between axially spaced walls. As described above, radially adjacent flow control vanes 230 cooperate to form radially and circumferentially extending flow corridors 232 each having a radially outer circumferential opening 234 and a radially inner circumferential opening 236.

In contrast to the flow control vanes 30, 130, the flow control vanes 230 shown in FIG. 4 have a smaller circumferential length to create shorter flow corridors 232. Also, the flow control vanes 230 do not have a continuously reducing radius of curvature. Instead, the radius of curvature of each of the flow control vanes 230 varies between the radially outer circumferential opening 234 and radially inner circumferential opening 236 of each flow corridor 232.

In the embodiments illustrated in FIGS. 1 to 4, the radially inner circumferential opening 36, 236 of each flow corridor 32, 132, 232 is positioned radially outwardly of the substantially annular axially oriented radially inner opening 20, 120, 220 of each volute 16, 116, 216.

In any of the above embodiments, it may be desirable to pivotally mount one or more of the flow control vanes, for example about pivotal mountings 242 as shown in FIG. 4, so that the sweep angle of the flow control vanes can be varied.

Although exemplary embodiments have been described in the preceding paragraphs, it should be understood that various modifications may be made to those embodiments without departing from the scope of the appended claims. Thus, the breadth and scope of the claims should not be limited to the above-described exemplary embodiments. Each feature disclosed in the specification, including the claims and drawings, may be replaced by alternative features serving the same, equivalent or similar purposes, unless expressly stated otherwise.

Unless the context clearly requires otherwise, throughout the description and the claims, the words "comprise", "comprising", and the like, are to be construed in an inclusive as opposed to an exclusive or exhaustive sense; that is to say, in the sense of "including, but not limited to".

The invention claimed is:

1. An impulse air turbine arrangement for use with a reversing bi-directional air flow in a wave power plant, the impulse air turbine arrangement comprising:
    an axial flow turbine rotor mounted for rotation about a turbine axis;
    volutes mounted on each side of the turbine rotor to direct the reversing air flow to and from the turbine rotor, each volute extending circumferentially with respect to the turbine axis between a radially outer opening and a radially inner opening;

the radially outer opening being oriented for input/output of the air in a tangential direction and the radially inner opening being oriented axially to impinge/receive swirling air flow onto/from the turbine rotor.

2. An impulse air turbine arrangement according to claim 1, wherein a cross-sectional flow area of each volute decreases from the radially outer opening towards the radially inner opening.

3. An impulse air turbine arrangement according to claim 1, wherein the radially inner opening of each volute is substantially annular in cross-section.

4. An impulse air turbine arrangement according to claim 1, wherein each volute comprises a pair of axially spaced walls and a plurality of radially and circumferentially extending flow control vanes located between the axially spaced walls.

5. An impulse air turbine arrangement according to claim 4, wherein the radially inner opening of each volute is provided at a substantially central region of the wall adjacent to the turbine rotor.

6. An impulse air turbine arrangement according to claim 4, wherein at least one of the walls of each volute is movable axially with respect to the turbine axis to vary a flow area through each volute.

7. An impulse air turbine arrangement according to claim 4, wherein one or more of the flow control vanes is movable to vary its sweep angle.

8. An impulse air turbine arrangement according to claim 4, wherein one or more radially adjacent flow control vanes cooperate to define one or more radially and circumferentially extending flow corridors within each volute, each flow corridor comprising a radially outer circumferential opening and a radially inner circumferential opening.

9. An impulse air turbine arrangement according to claim 8, wherein the radially inner circumferential opening of each flow corridor is positioned radially outwardly of the axially oriented radially inner opening of each volute.

10. An impulse air turbine arrangement according to claim 1, wherein each volute comprises a circumferentially extending duct.

11. An impulse air turbine arrangement according to claim 1, further comprising a turbine casing surrounding the turbine rotor and extending axially between the volutes.

12. A wave power plant comprising a wave energy converter for providing a reversing bi-directional air flow and an impulse air turbine arrangement according to claim 1 arranged to be driven by the reversing bi-directional air flow and coupled to an electrical generator to drive the electrical generator.

* * * * *